United States Patent
Rumsey

(10) Patent No.: US 9,616,656 B2
(45) Date of Patent: Apr. 11, 2017

(54) METHODS OF COLOURING A FOAMED POLYOLEFIN PRODUCT AND A FLIGHT CASE

(71) Applicant: XPE Limited, Hertfordshire (GB)

(72) Inventor: Ian Rumsey, Hertfordshire (GB)

(73) Assignee: XPE Limited, Hertfordshire (GB)

( * ) Notice: Subject to any disclaimer, the term of this patent is extended or adjusted under 35 U.S.C. 154(b) by 0 days.

(21) Appl. No.: 14/782,025

(22) PCT Filed: Apr. 7, 2014

(86) PCT No.: PCT/GB2014/051074
§ 371 (c)(1),
(2) Date: Oct. 2, 2015

(87) PCT Pub. No.: WO2014/167302
PCT Pub. Date: Oct. 16, 2014

(65) Prior Publication Data
US 2016/0052256 A1    Feb. 25, 2016

(30) Foreign Application Priority Data

Apr. 8, 2013    (GB) .................................. 1306289.8
Jul. 10, 2013   (GB) .................................. 1312373.2
Nov. 27, 2013   (GB) .................................. 1320897.0

(51) Int. Cl.
*B41F 17/00*    (2006.01)
*A45C 5/03*     (2006.01)
(Continued)

(52) U.S. Cl.
CPC ................ *B41F 17/00* (2013.01); *A45C 5/02* (2013.01); *A45C 5/03* (2013.01); *A45C 5/04* (2013.01);
(Continued)

(58) Field of Classification Search
None
See application file for complete search history.

(56) References Cited

U.S. PATENT DOCUMENTS 4,773,147 A * 9/1988 Schurman ................ A45C 5/02
                                                    206/527
5,318,660 A * 6/1994 Olsen ................... B32B 37/0076
                                                    156/231
(Continued)

FOREIGN PATENT DOCUMENTS

DE          10054803       5/2002
DE         102007062600    6/2009
(Continued)

*Primary Examiner* — Leslie J Evanisko
*Assistant Examiner* — Michael Robinson
(74) *Attorney, Agent, or Firm* — Patti & Malvone Law Group, LLC

(57) ABSTRACT

A method of manufacturing a polyolefin product is disclosed. The method includes the steps of printing an image on a transfer medium, hot pressing a carrier medium (such as a textile or wood product) and the transfer medium such that the image is transferred to the carrier medium, and adhering the carrier medium to a first polyolefin article to produce a polyolefin product. The polyolefin product may then be subject to further processes, such as cutting, thermoforming, etc. into its desired form. An improved method of producing polyolefin products having colorful imagery thereon is provided. A method of manufacturing a case is also disclosed, including printing an image on a transfer medium, hot pressing a carrier medium and the transfer medium such that the image is transferred to a first side of the carrier medium, and assembling a case, wherein a panel for the case includes the carrier medium.

13 Claims, 12 Drawing Sheets

(51) Int. Cl.
  *B32B 38/00* (2006.01)
  *A45C 5/02* (2006.01)
  *A45C 5/04* (2006.01)
  *B65D 88/14* (2006.01)
  *A45C 13/08* (2006.01)

(52) U.S. Cl.
  CPC ............ *A45C 13/08* (2013.01); *B32B 38/145* (2013.01); *B65D 88/14* (2013.01); *A45C 2005/037* (2013.01); *B32B 2309/02* (2013.01); *B32B 2309/04* (2013.01); *B32B 2309/12* (2013.01); *B32B 2439/00* (2013.01); *B32B 2607/00* (2013.01)

(56) References Cited

U.S. PATENT DOCUMENTS

| | | | | |
|---|---|---|---|---|
| 5,555,813 | A * | 9/1996 | Hale | B41F 16/02 101/488 |
| 5,816,395 | A * | 10/1998 | Dougherty | G10G 7/005 150/162 |
| 5,833,039 | A * | 11/1998 | Kotkins, Jr. | A45C 3/001 16/405 |
| 6,300,279 | B1 * | 10/2001 | Macedo | B41M 5/0358 428/913 |
| 2002/0029714 | A1 * | 3/2002 | Hale | B41F 16/02 101/484 |
| 2003/0098906 | A1 * | 5/2003 | Randen | B41M 3/12 347/103 |
| 2004/0231941 | A1 * | 11/2004 | Van Hoye | A45C 5/02 190/124 |
| 2006/0064993 | A1 | 3/2006 | Tofflemire | |
| 2008/0314513 | A1 | 12/2008 | Gauss et al. | |
| 2009/0008202 | A1 * | 1/2009 | Dayton | A45C 5/14 190/100 |
| 2009/0155612 | A1 | 6/2009 | Pervan et al. | |

FOREIGN PATENT DOCUMENTS

| | | |
|---|---|---|
| JP | 2004291310 | 10/2004 |
| WO | 03/062523 | 7/2003 |
| WO | 2005004054 | 1/2005 |
| WO | 2007006006 | 1/2007 |

* cited by examiner

METHODS OF COLOURING A FOAMED POLYOLEFIN PRODUCT AND A FLIGHT CASE

FIELD OF THE INVENTION

This invention relates to a method of manufacturing a foamed polyolefin product and a method of manufacturing a case, such as a flight case.

BACKGROUND OF THE INVENTION

Polyolefin is a popular material (sometimes referred to as polyalkene) used to make a variety of products, such as swim floats, gym mats, camping mats, garden kneelers, toys etc. Polyolefin products are typically constructed out of a single piece of polyolefin of a single colour by conventional manufacturing processes (e.g. being cut into the desired form).

To improve the look and branding potential for these products, it is desirable for manufacturers to add colourful imagery. In conventional polyolefin products, manufacturers have not succeeded in surface-printing the material and have instead relied on laser etching, heat embossing and colour infill to improve the branding. This problem, is particularly acute for foamed polyolefin products such as those made from ethylene vinyl acetate (EVA) or polyethylene (PE) foam. For example, screen-printing or other direct printing techniques often fail because the surface of the foam has broken or cut cells which form pits which do not become inked. Accordingly, the final printed image is of low continuity and of low intensity since much of the substrate foam colour remains visible amongst the inked image parts. In the example of a swimming float, the only cost effective solution for manufacturers is to use single or multi coloured layers, which are then cut to shape and either laser etched or heat embossed to improve the branding or provide other indications (such as warning details). Thus the outcome is either a pattern of different grooves or patterns formed by variations in the depth of the surface, or a collage or mosaic of several different colour materials fixed together. These methods are not cost effective, lack durability and limit the scope of imagery that may be applied to the polyolefin product.

Polyolefin is also used to manufacture kitting trays. A kitting tray has a plurality of compartments, wherein the user may place a component for a product in a designated compartment. This segregation of components increases the likelihood that the correct component is used when assembling the product. However, users tend to accidentally place components in the wrong compartment (for example, by mistaking one part for a similarly shaped and dimensioned component). This can be particularly dangerous if, for example, the user is constructing a product in a field in which safety is paramount (such as the aviation industry).

Flight cases (sometimes referred to as road cases) are containers used for transporting goods. A flight case is typically used to transport fragile goods, and is often used in music, racing, shipping and medical industries. A flight case is usually a cuboid having six panels (made of hard materials such as astroboard, multiplex plywood, aluminium plate, PVC laminated plywood) riveted to aluminium extrusions which connect the panels together.

To improve the branding potential for the flight case, manufacturers add colourful imagery to the panels. This typically includes the panels being printed or emblazoned using processes such as screen printing, or vinyl cut graphics and sticker application. However, these processes rely on large volumes of product to make them cost effective, and they suffer from poor durability.

U.S. Pat. No. 6,212,683A describes a self-adhesive, disposable, laminated protective garment, such as a bib. The garment is laminated with a liquid-absorbent layer which may be porous paper, non-woven cotton or various multiple layered absorbent materials, on the front and a liquid-impermeable layer at the back. Printing is applied directly to the absorbent front layer as a continuous sheet, by rolling between printing drums using a thermal transfer or applied on-line ink transfer method. Alternatively, printing may be carried out using an electrostatic printhead in place of pairs of printing drums. The printed absorbent layer and liquid impermeable layer are laminated together using an adhesive, to form the finished product.

JP2004-034497A describes a lighting fixture using a two-layered material having a coloured translucent fibrous material bonded to a transparent layer. The fibrous coloured sheet may be coloured using ink jet printing, gravure printing, screen printing, printing by offset printing and the like. For materials which cannot be printed using these techniques, a prior surface treatment of the fibrous sheet is proposed, such as applying a partial benzal polyvinyl alcohol resin before printing.

It is therefore desirable to alleviate some or all of the above problems.

SUMMARY OF THE INVENTION

According to the invention, there is provided a method of manufacturing a case comprising the steps of claim 1 appended hereto.

The method according to the second aspect of the invention may provide a flight case having an image applied to any one or several panels. The panels may be manufactured and branded in the same process, such that the case may be finished with the desired imagery quickly, cost effectively (regardless of quantity), and with improved durability.

The panel for the case may include a panel medium and the carrier medium, and the method further comprises the step of adhering the carrier medium to the panel medium. The panel may therefore comprise either the carrier medium alone (for example, if the carrier medium is a suitable material such as a hard board or aluminium sheet), or the carrier medium adhered to a suitable panel material (such as astroboard, plywood, etc.).

The step of hot pressing the carrier medium and the transfer medium may be at a temperature of 160-200 degrees Celsius (and optionally 190-210 degrees Celsius), a light-to-medium pressure such as 6.2-7.6 MPa and for 40-200 seconds (optionally 100-200 seconds).

In a second aspect of the invention, there is provided a method of manufacturing a foamed polyolefin product, as set out in claim 7 appended hereto.

This produces improved polyolefin products, which include a polyolefin article adhered to a carrier medium, wherein the carrier medium includes the desired imagery. The image may therefore be a colourful image suitable for the intended use or market of the product, which vastly improves its visual appearance and branding potential.

A variety of polyolefin products may therefore be produced by the method of the present invention, such as swim float, gym mats, garden kneelers, kitting trays etc. The particular carrier medium and particular type of polyolefin article may therefore be chosen by the manufacturer to give the product certain characteristics. Furthermore, the polyolefin product may be subject to several subsequent manufacturing processes (such as cutting, thermoforming, routing etc.) and the particular materials may be chosen to suit the subsequent manufacturing process.

The step of adhering the carrier medium to the first polyolefin article may include the steps of placing a hot melt adhesive between the first polyolefin article and a second side of the carrier medium; and hot pressing the first polyolefin article and carrier medium. The process may therefore employ the step of hot pressing the first polyolefin article and carrier medium to adhere the first polyolefin article and carrier medium.

The step of hot pressing the first polyolefin article and carrier medium may be at a temperature of 90-130 degrees Celsius, a pressure of 6.2-7.6 MPa and for 20-25 seconds.

The step of heat pressing the carrier medium and transfer medium may be at a temperature of between 160-200 degrees Celsius (and optionally 190-210 degrees), a light-to-medium pressure such as a pressure of 4.1-5.5 MPa and for 40-60 seconds.

The carrier medium may be a textile product, such that the polyolefin product may produce a swim float, gym mat, tool tray etc.

The method may further comprise the steps of cutting, thermoforming, sawing or routing the polyolefin article, or heat laminating the polyolefin product to a second polyolefin article.

The image may relate to a component for a kitting tray, and the method may further comprise the steps of cutting the second polyolefin article to produce a compartment, wherein the image is aligned with the compartment. The kitting tray may therefore have images of the component intended for that compartment or other identifiers (such as part numbers). This ensures that the user does not accidentally use the wrong component when using a kitting tray to assemble a product. This is particularly useful in industries in which safety is paramount (such as the aviation industry).

The carrier medium may be a wood product, and the step of adhering the wood product to the first polyolefin article may include the steps of placing contact adhesive between the first polyolefin article and a second side of the wood product.

The step of hot pressing the wood product and the transfer medium may be at a temperature of 160-200 degrees Celsius (and optionally 190-210 degrees Celsius), a light-to-medium pressure such as 6.2-7.6 MPa and for 50-190 seconds.

BRIEF DESCRIPTION OF DRAWINGS

Embodiments of the invention will now be described, by way of example, and with reference to the drawings in which: —

DETAILED DESCRIPTION OF THE INVENTION

Figure 1:
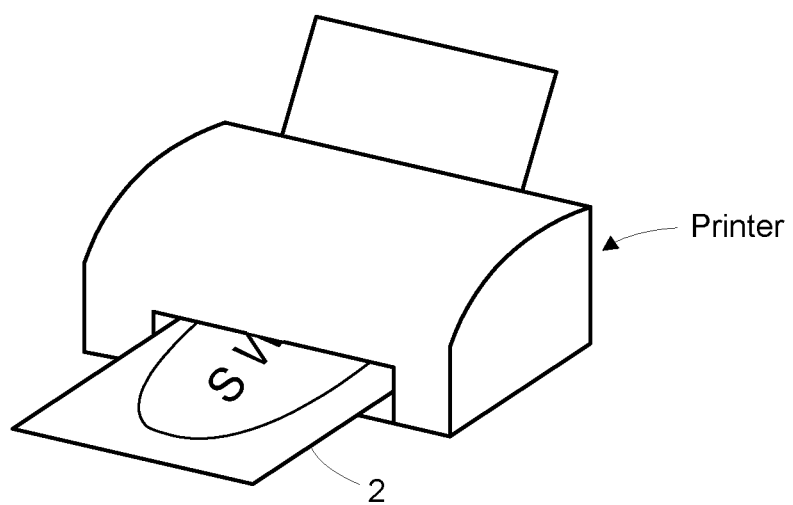
FIG. 1 illustrates a step of a first embodiment of a method of manufacturing a polyolefin product, showing a printer and transfer medium.

A first embodiment of a method of manufacturing a polyolefin product will now be described with reference to FIGS. 1 to 4. FIG. 1 shows a format printer (which, in this example, is an Epson™ 9700), which is printing an image onto a transfer medium such as a piece of transfer paper 2 (which is also known as carrier paper). In this embodiment, the image printed onto the carrier paper 2 is a reverse coloured image suitable for a swim float.

Figure 2:
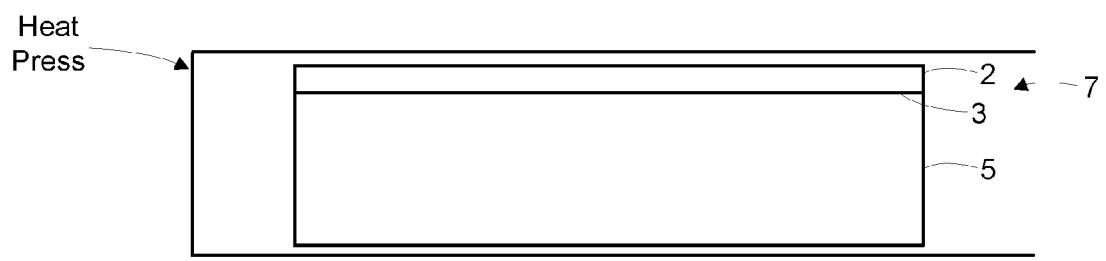
FIG. 2 illustrates another step of the embodiment of FIG. 1, showing the transfer medium being heat pressed to a carrier medium to produce a printed carrier medium.

As shown in FIG. 2, the carrier paper 2 is placed print side down onto a first side 3 of a textile medium 5. In this embodiment, the textile medium 5 is a 2 m×1 m sheet of 140 gsm Sporttrikot textile (produced by A. Berger and supplied by CMY UK Limited). The Sporttrikot textile and carrier paper 2 are placed in a format heat press (such as the Mondi 200), and heat pressed for 50 seconds at a temperature of 200 degrees Celsius at a pressure of 700 psi (~4.8 MPa). Accordingly, the image is transferred from the carrier paper 2 to the first side 3 of textile medium 5 and has the intended alignment (as the image is no longer reversed). This process is known as dye-sublimation and produces a printed textile medium 7.

Figure 3:
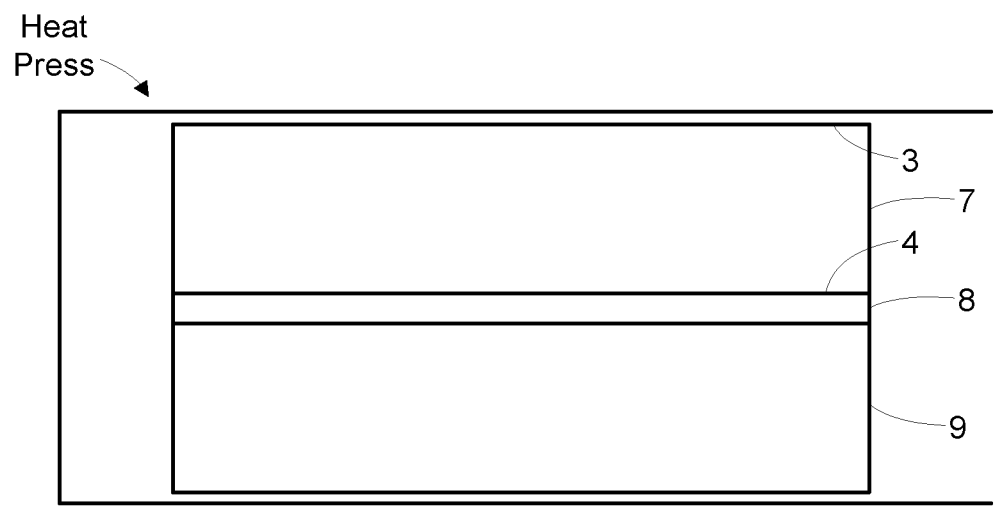
FIG. 3 illustrates another step of the embodiment of FIG. 1, showing the printed carrier medium being heat pressed to a first polyolefin article.

The printed textile medium 7 is then bonded to a first polyolefin article 9. In this embodiment, the first polyolefin article 9 is a 2 m×1 m×30 mm sheet of LD33 polyethylene foam (produced by Zotefoams, Croydon). As shown in FIG. 3, the first polyolefin article 9 is placed on a large format heat press (again, a Mondi 200), a sheet of hot melt adhesive 8 (in this embodiment, a PE hot melt adhesive such as "Collano 22-110-25" as supplied by Cornelius, Bishops Stortford) is placed on the first polyolefin article 9 and the printed textile medium 7 is placed on top of the hot melt adhesive 8. The printed textile medium 7 is placed such that a second side 4 of the printed textile medium 7 faces the hot melt adhesive 8 and first polyolefin article 9 (and the first side 3 of the printed textile medium 7 faces away from the first polyolefin article 9).

The printed textile 7, hot melt adhesive 8 and first polyolefin article 9 are then heat pressed for 22 seconds at a temperature of 120 degrees Celsius and a pressure of 1000 psi. This process adheres the printed textile 7 (including the image) to the first polyolefin article 9, thus producing a polyolefin product 1 having the image on an external surface.

Figure 4:
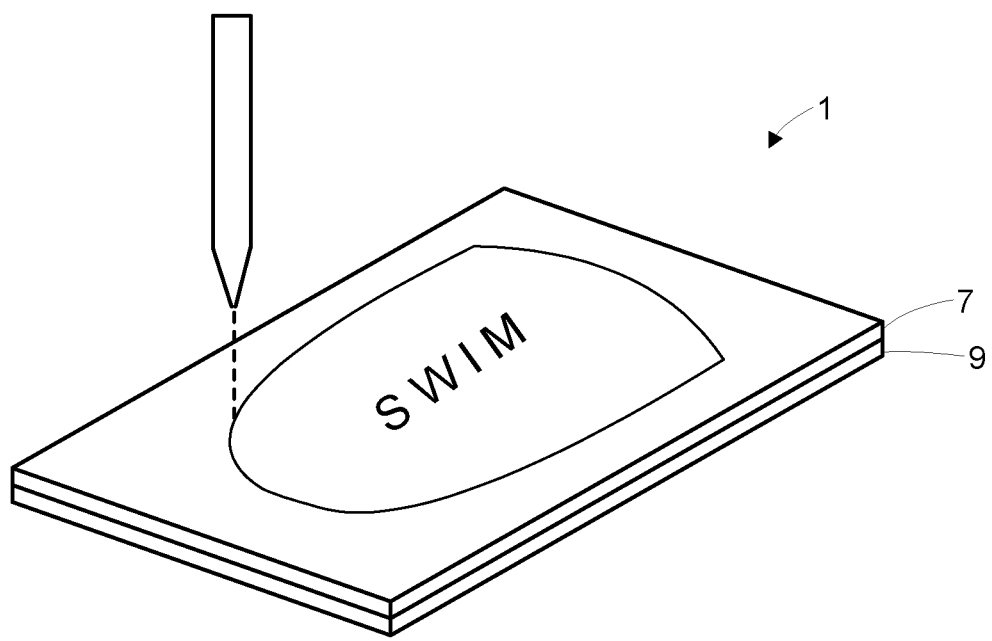
FIG. 4 illustrates another step of the embodiment of FIG. 1, showing the polyolefin product being cut.

In this embodiment, the polyolefin product 1 is cut to shape using a waterjet cutter (as shown in FIG. 4). This produces a swim float including the image on the external surface.

A second embodiment of a method of manufacturing a polyolefin product will now be described. In this embodiment, a printed textile medium 17 is produced in a similar manner to the first embodiment (that is, by dye sublimation). However, the carrier medium in this embodiment is a 2 m×1 m sheet of 190 gsm polyester matt textile (produced by Brook International).

Subsequently, the printed textile medium 17 is bonded to a first polyolefin article 19 (in this embodiment, a 2 m×1 m×8 mm sheet of EVA 50 foam, such as that produced by Zotefoams, Croydon) using hot melt adhesive. This produces the polyolefin product 10.

Figure 5:
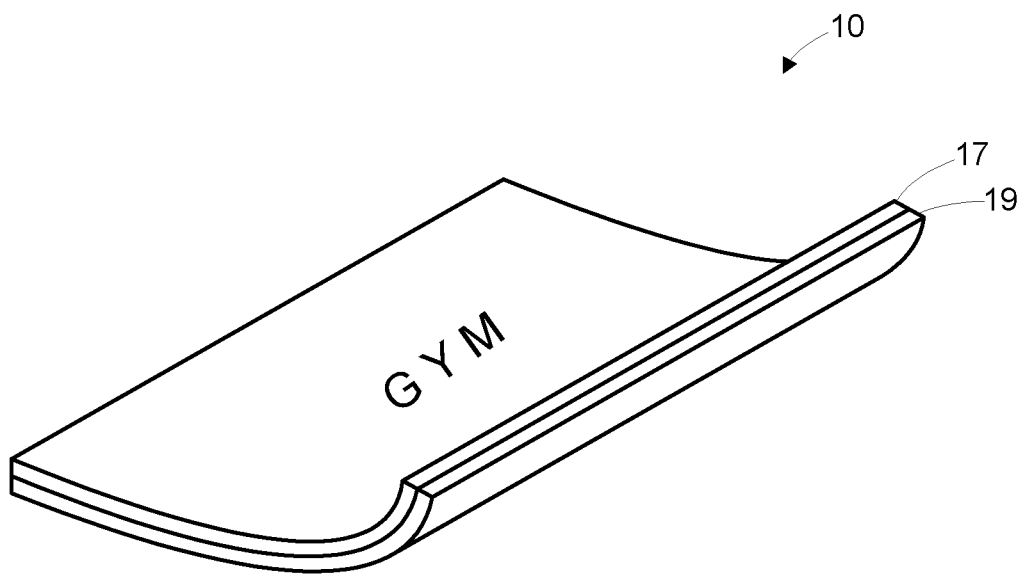
FIG. 5 illustrates a step of a second embodiment of a method of manufacturing a polyolefin product, showing a thermoformed polyolefin product.

As shown in FIG. 5, the polyolefin product 10 is then thermoformed into the desired shape and form. In this embodiment, the polyolefin product 10 is placed in an infra-red oven at 120 degrees Celsius for a period of 150 seconds. The polyolefin product 10 is then placed in a moulding press preset with the required tooling for shaping the product 10. In this embodiment, the polyolefin product 10 is thermoformed for 180 seconds into the shape of a gym mat. This produces a thermoformed gym mat including the image on an external surface.

A third embodiment of a method of manufacturing a polyolefin product will now be described. In this embodiment, a printed textile medium 27 is produced in an identical manner to the second embodiment (that is, by dye sublimation using a polyester matt textile as the carrier medium 25). However, the image transferred to the printed textile medium 27 relates to an outline for a plurality of compartments, wherein each compartment is for a particular component for a kitting tray and includes an identifier for the respective component. The identifier typically is a 1:1 scale, photorealistic image of the part that should be in the compartment.

The printed textile medium 27 is then bonded to a first polyolefin article 29a. In this embodiment, the first polyolefin article 29a is a 2 m×1 m×30 mm sheet of LD45 foam (produced by Zotefoams, Croydon). The first polyolefin article 29a is placed on a large format heat press (again, a Mondi 200), a sheet of hot melt adhesive (in this embodiment, a PE hot melt adhesive such as "Collano 22-110-25" as supplied by Cornelius, Bishops Stortford) is placed on the first polyolefin article 29a and the printed textile medium 27 is placed on top of the hot melt adhesive. The printed textile medium 27 is placed such that a second side of the printed textile medium 27 faces the hot melt adhesive and first polyolefin article 29a (and the first side of the printed textile medium 27 (including the image) faces away from the first polyolefin article 29a).

The printed textile 27, hot melt adhesive and first polyolefin article 29a are then heat pressed for 22 seconds at a temperature of 120 degrees Celsius and a pressure of 1000 psi. This process adheres the printed textile 27 (including the image) to the first polyolefin article 29a. The image therefore appears on an external surface.

Figure 6:
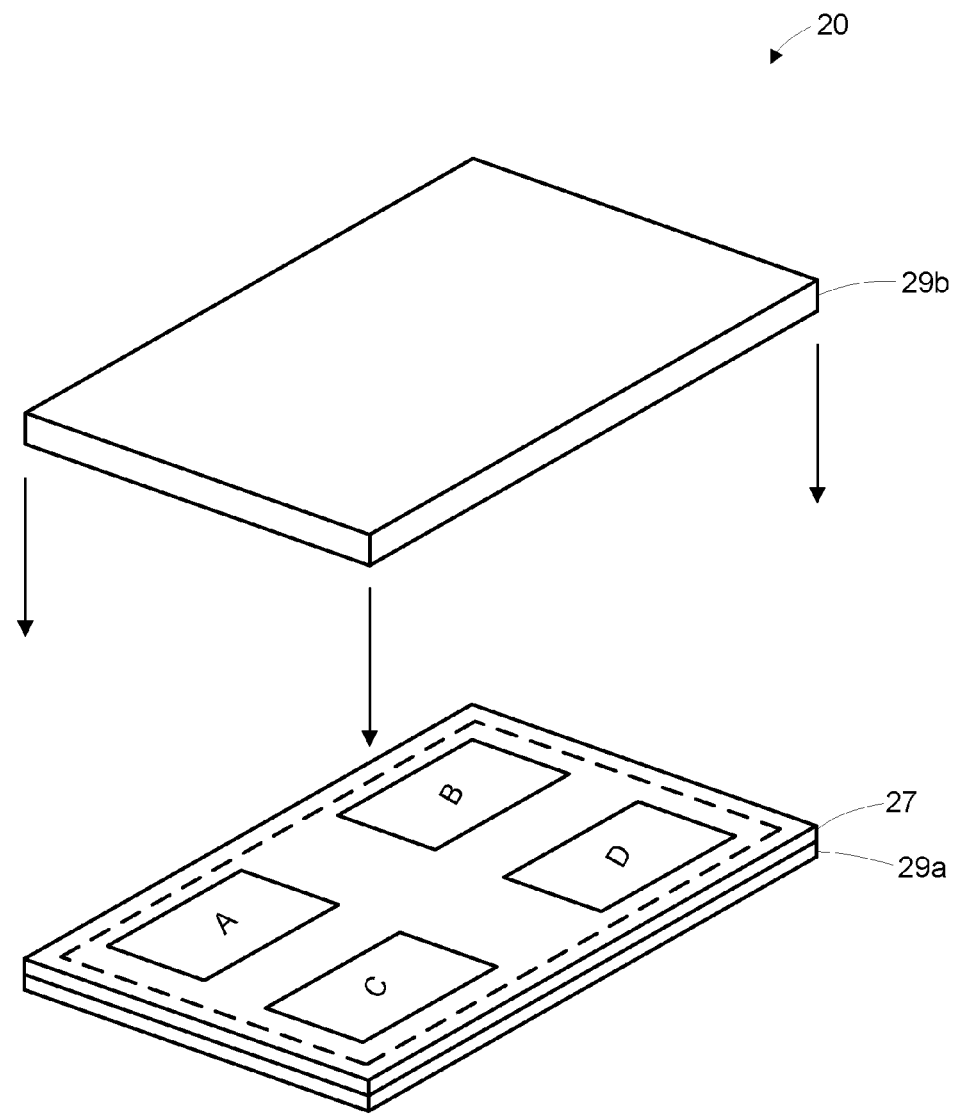
FIG. 6 illustrates a step of a third embodiment of a method of manufacturing a polyolefin product, showing a printed carrier medium and first polyolefin article being heat laminated to a second polyolefin article.
Figure 7:
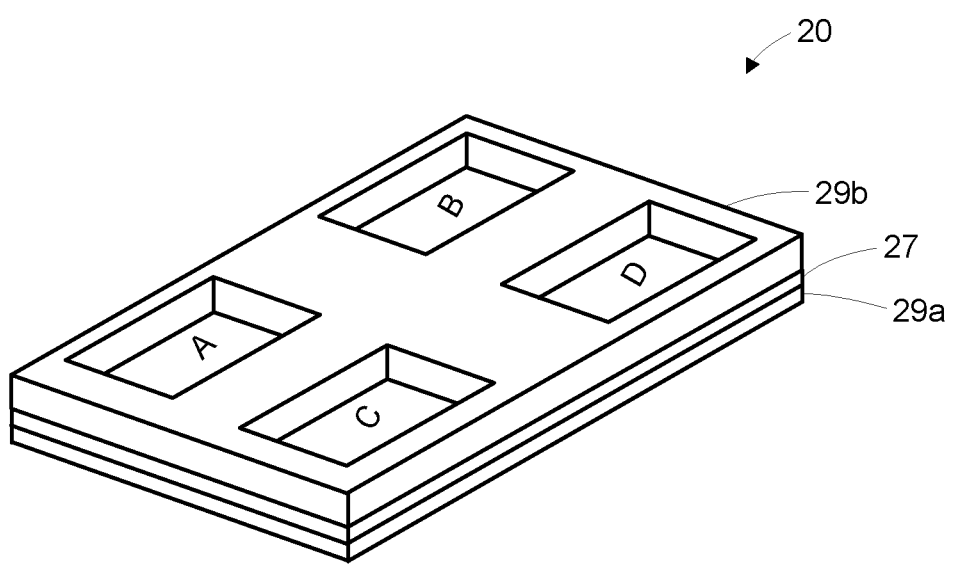
FIG. 7 illustrates another step of the embodiment of FIG. 6, wherein apertures are bored into the polyolefin product.

As shown in FIG. 6, the printed textile 27 and first polyolefin article 29a are then heat laminated to a second polyolefin article 29b to produce a polyolefin product 20. This is performed in a heat laminating machine using further foam slabs until the required thickness is reached. The outer edge of the polyolefin product 20 (as depicted by dotted lines) is then cut (using a waterjet cutter) to form a kitting tray. Apertures are then cut into the second polyolefin article 29b to produce compartments correlating with the image on the external surface.

Figure 8:
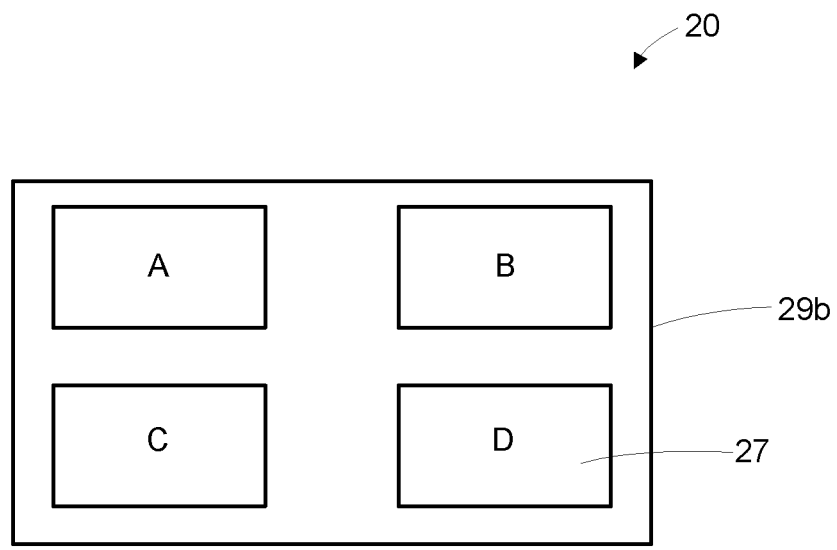
FIG. 8 illustrates a plan view of the polyolefin product of FIGS. 6 and 7.

This results in a kitting tray having a plurality of compartments, optionally of differing depths, with the image forming the base of the compartments and including identifiers for the component associated with that compartment (such as an image or part number of the component, see FIG. 8).

A fourth embodiment of a method of manufacturing a polyolefin product will now be described. In this embodiment, a printed textile medium is produced in an identical manner to the first embodiment (that is, using dye sublimation and a 2 m×1 m sheet of 140 gsm Sporttrikot textile). The printed textile medium is then bonded to a first polyolefin article, which, in this embodiment is a 2 m×1 m×30 mm sheet of LD45 polyethylene foam using hot melt adhesive and a hot press process.

The printed textile and first polyolefin article are then heat laminated to a second polyolefin article (such as further foam slabs) to produce a polyolefin product. An outer edge of the polyolefin product is then cut (using a band saw) to produce a tool tray. The tool tray is then transferred to a CNC Routing machine to bore apertures into the tray.

A fifth embodiment of a method of manufacturing a polyolefin product will now be described. In this embodiment, the carrier medium 43 is a 2 m×1 m×3 mm polyester coated (matt or gloss) hardboard (such as supplied by I-Sub, Kettering). The hardboard sheet is placed on a heat press, and a carrier paper including an image is placed print side down on the hardboard and secured using heat tape which is capable of remaining adhered at elevated temperatures. The hardboard, heat tape and carrier paper are then heat pressed for 180 seconds at a temperature of 200 degrees Celsius at a pressure of 1000 psi (~6.9 MPa). The image is thus transferred to the hardboard. The image is preferably prepared on the carrier paper in full colour so that the full colour image is transferable to the hardboard in one pressing step in a single full colour process.

The carrier paper is then removed from the printed hardboard. The printed hardboard is then cut to size using a bandsaw and adhered to a first polyolefin article by contact adhesive to produce the polyolefin product. The polyolefin product is then transferred to a CNC routing machine for routing. This produces a routed foam tray with a hard top.

The skilled person will understand that the above embodiments illustrate several examples of producing polyolefin products including an image thereon. The image is transferred to a carrier medium (which may be, for example, a textile medium or wood product), and adhered to a polyolefin article, which may then be cut into the desired shape and form for the product. The manufacturing process of the present invention therefore produces more desirable polyolefin products with full coloured and vibrant images, compared to conventional polyolefin products which have been limited to very primitive and expensive imaging processes.

The skilled person will understand that the manufacturing processes of the present invention may be applied to any suitable transfer medium, carrier medium and polyolefin article, using any suitable printer, heat press or other manufacturing equipment. For example, the carrier medium may be a textile medium or wood product, and the polyolefin article may be one of several foam products. Furthermore, the explicit temperatures, pressures and time periods given above are as an example only, and the skilled person will understand that ranges about those examples would be suitable for the present invention.

The skilled person will also understand that the polyolefin products may be subject to several further manufacturing processes, such as waterjet cutting, thermoforming, routing etc.

An embodiment of a method of manufacturing a case will now be described with reference to FIGS. 9 to 12. In this embodiment, the case is a flight case 100 (which, as the skilled person will understand, typically includes several panels joined by aluminium extrusions).

Figure 9:
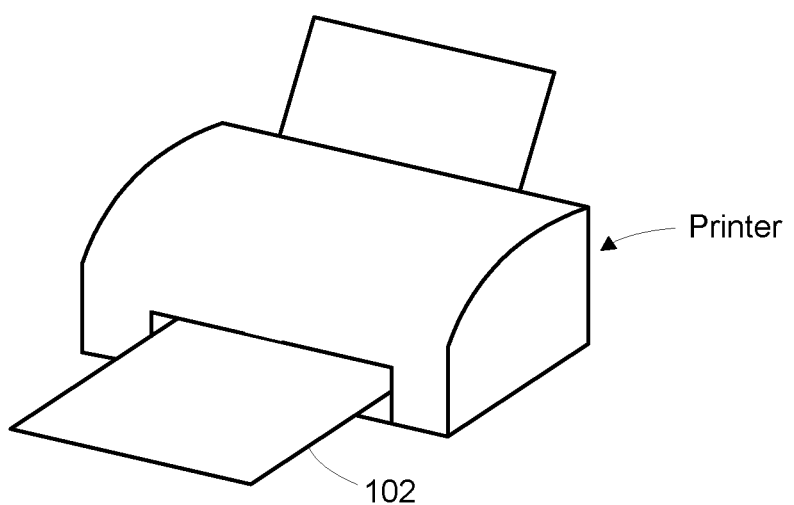
FIG. 9 illustrates a step of an embodiment of a method of manufacturing a case.

FIG. 9 shows a format printer (which, in this example, is an Epson™ 9700), which is printing an image onto a transfer medium 102 such as a piece of transfer paper (which is also known as carrier paper). The image is preferably prepared on the transfer or carrier paper in full colour so that the full colour image is transferable to the hardboard in one pressing step in a single full colour process. In this embodiment, the image printed onto the carrier paper 102 is a reverse, coloured image suitable for a flight case panel.

Figure 10:
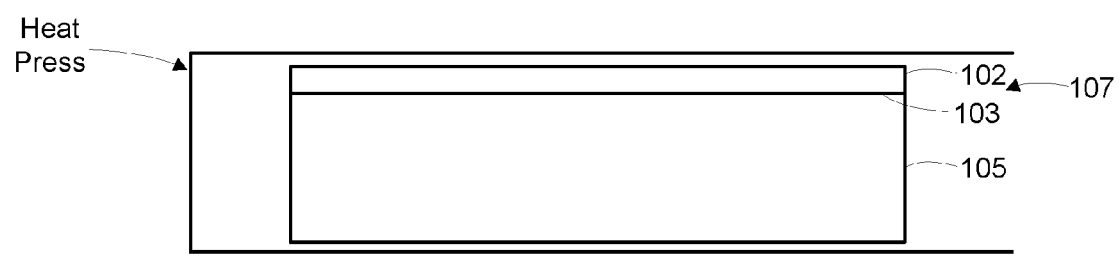
FIG. 10 illustrates another step of the embodiment of FIG. 10, showing the transfer medium being heat pressed to a carrier medium to produce a printed carrier medium.

As shown in FIG. 10, the carrier paper 102 is placed print side down onto a first side 103 of a carrier medium 105. In this embodiment, the carrier medium 105 is a 2150 mm×1200 mm×3.17 mm hard board sheet (as supplied by Universal Woods EMEA, Belgium).

The carrier paper 102 and carrier medium 105 are placed in a format heat press (such as a Mondi heat press), and heat pressed for 140 seconds at a temperature of 195 degrees Celsius and a pressure of 1000 PSI (~6.9 MPa). The image is therefore transferred from the carrier paper 102 to the first side 103 of the carrier medium 105 and has the intended alignment (as the image is no longer reversed). This process is known as dye sublimation and produces a printed carrier medium 107.

Figure 11:
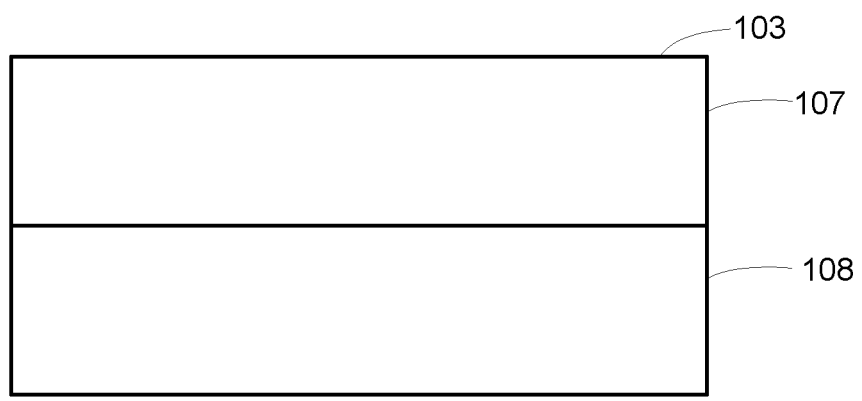
FIG. 11 illustrates another step of the embodiment of FIG. 10, showing the printed carrier medium being adhered to a panel medium.

In this embodiment (as shown in FIG. 11), the printed carrier medium 107 is cooled, cut to the required size (i.e. the intended size of a particular panel for the flight case 100), and then adhered to a panel medium 108 using suitable adhesive (such as contact or spray adhesive).

The above steps are repeated for each panel of the flight case 100 requiring an image. In this embodiment, six panels are produced, each including an image.

Figure 12:
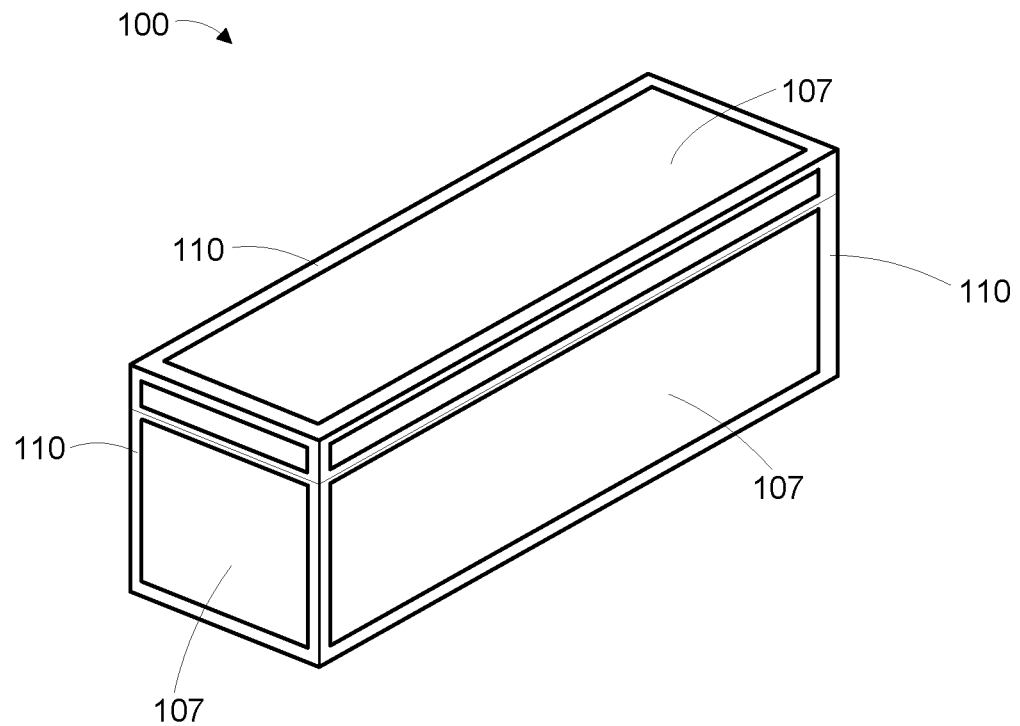
FIG. 12 illustrates another step of the embodiment of FIG. 10, showing an assembled case.

The flight case 100 is then assembled. Accordingly, aluminium extrusions 110 are used to join the panels together, thus producing a flight case as shown in FIG. 12.

The skilled person will understand that it is not essential for the printed carrier medium 107 to be adhered to a separate panel medium. That is, the printed carrier medium 107 may either be layered together with the panel medium within a recess of the aluminium extrusion 110, or the panel medium may be omitted altogether (such that the panel is formed from the printed carrier medium 107 alone).

In the above embodiment, the carrier medium is a sheet of hard board. However, the skilled person will understand that other suitable substrate may be used (such as aluminium, MDF fibreboard, FRP plastic), and the dye sublimation process may be tailored to the particular material (such as by varying the time, temperature and pressure of the process).

The skilled person will also understand that the exact time, temperature, and pressure of the dye sublimation step described above is an example, and ranges about these values may be used.

The skilled person will understand that any combination of features is permissible within the scope of the invention, as claimed.

The invention claimed is:

1. A method of manufacturing a foamed polyolefin product, the method comprising the steps of:
   printing a full color image on a transfer medium;
   hot pressing a carrier medium and the transfer medium such that the image is transferred to a first side of the carrier medium;
   removing the transfer medium from the carrier medium; and
   adhering the carrier medium to a first foamed polyolefin article to produce a foamed polyolefin product by hot pressing the first foamed polyolefin article and the carrier medium at a temperature of 90-130 degrees Celsius, at a pressure of 6.2-7.6 MPa and for a duration of 20-25 seconds.

2. A method as claimed in claim 1, wherein the step of adhering the carrier medium to the first foamed polyolefin article further comprises the step of:
   placing a hot melt adhesive between the first foamed polyolefin article and a second side of the carrier medium.

3. A method as claimed in claim 1, wherein the carrier medium is constructed from a textile material.

4. A method as claimed in claim 1, further comprising the steps of:
   cutting the foamed polyolefin product.

5. A method as claimed in claim 1, further comprising the steps of:
   thermoforming the foamed polyolefin product.

6. A method as claimed in claim 1, further comprising the steps of:
   heat laminating the foamed polyolefin product to a second foamed polyolefin article.

7. A method as claimed in claim 6, wherein the image relates to a component for a kitting tray, the method further comprising the steps of:
   cutting the second foamed polyolefin article to produce a compartment, wherein the image is aligned with the compartment.

8. A method as claimed in claim 6, further comprising the steps of:
   sawing the foamed polyolefin product.

9. A method as claimed in claim 1, wherein the carrier medium is a wood product and the step of hot pressing the carrier medium and the transfer medium uses heat tape.

10. A method as claimed in claim 9, wherein the step of hot pressing the carrier medium and the transfer medium is carried out at a temperature of 190-210 degrees Celsius, at a pressure of 6.2-7.6 MPa and for a duration of 50-190 seconds.

11. A method as claimed in claim 9, wherein the step of adhering the wood product to the first foamed polyolefin article includes the step of:
   placing contact adhesive between the first foamed polyolefin article and a second side of the wood product.

12. A method as claimed in claim 9, further comprising the step of:
   routing the foamed polyolefin product.

13. A method of manufacturing a foamed polyolefin product, the method comprising the steps of:
   printing an image on a transfer medium;
   hot pressing a carrier medium and the transfer medium such that the image is transferred to a first side of the carrier medium;
   separating the transfer medium from the carrier medium; and
   adhering the carrier medium to a first foamed polyolefin article to produce a foamed polyolefin product by placing a hot melt adhesive between the first foamed polyolefin article and a second side of the carrier medium; and hot pressing the first foamed polyolefin article and carrier medium by applying heat and pressure to bring the first foamed polyolefin article and carrier medium together; and wherein the step of hot pressing the first foamed polyolefin article and carrier medium is carried out at a temperature of 90-130 degrees Celsius, at a pressure of 6.2-7.6 MPa and for a duration of 20-25 seconds.

* * * * *